United States Patent
Subramanian

(10) Patent No.: US 11,827,213 B2
(45) Date of Patent: Nov. 28, 2023

(54) PERSONALIZED NOTIFICATION SYSTEM FOR A VEHICLE

(71) Applicant: VOLVO TRUCK CORPORATION, Gothenburg (SE)

(72) Inventor: Dhivya Subramanian, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/449,731

(22) Filed: Oct. 1, 2021

(65) Prior Publication Data
US 2023/0103476 A1   Apr. 6, 2023

(51) Int. Cl.
*B60W 30/08* (2012.01)
*B60W 40/09* (2012.01)
*G06V 20/59* (2022.01)

(52) U.S. Cl.
CPC ............ *B60W 30/08* (2013.01); *B60W 40/09* (2013.01); *B60W 2030/082* (2013.01); *B60W 2540/221* (2020.02); *B60W 2556/45* (2020.02); *G06V 20/597* (2022.01)

(58) Field of Classification Search
CPC .............. B60W 30/08; B60W 40/09; B60W 2030/082; B60W 2540/221; B60W 2556/45; G06V 20/597
See application file for complete search history.

(56) References Cited

U.S. PATENT DOCUMENTS

| | | | | |
|---|---|---|---|---|
| 2017/0144671 | A1* | 5/2017 | Memani | B60W 40/09 |
| 2018/0025636 | A1* | 1/2018 | Boykin | H04R 3/005 |
| | | | | 701/1 |
| 2018/0127001 | A1* | 5/2018 | Ricci | B60W 50/14 |
| 2020/0207358 | A1* | 7/2020 | Katz | G01C 21/3697 |
| 2020/0353933 | A1* | 11/2020 | Gilbert | B60W 30/192 |
| 2021/0197832 | A1* | 7/2021 | Matsunami | B60K 28/06 |
| 2022/0234574 | A1* | 7/2022 | Lange | B60W 30/08 |

* cited by examiner

*Primary Examiner* — Ryan W Sherwin
(74) *Attorney, Agent, or Firm* — Venable LLP; Jeffri A. Kaminski

(57) ABSTRACT

A personalized notification system for a vehicle comprising: a positioning system; a communication unit; a data gathering unit configured to gather information about a driver of the vehicle, the data gathering unit comprising biometric sensor(s) and/or behavioral sensor(s), the data gathering unit being also configured for determining contact(s) to be warned in case of an emergency in relation with the location of the vehicle, said contacts being obtained from a memory and/or from the remote center; a database containing logged data from the positioning system and the data gathering unit; an emergency detection unit configured to receive an alert from the vehicle regarding a vehicle emergency situation and notify the contact(s) to be warned in case of an emergency as defined in the last registered logged data.

12 Claims, 1 Drawing Sheet

PERSONALIZED NOTIFICATION SYSTEM FOR A VEHICLE

TECHNICAL FIELD

The invention relates to a personalized notification system configured to be installed in a vehicle for safety reasons. The invention can be applied in heavy-duty vehicles, such as trucks, buses and construction equipment.

BACKGROUND

It is known to equip a vehicle with a communication unit configured to alert a call center in case of an accident.

This provision gives satisfaction in that it is possible to inform the call center automatically or to help a driver to contact the call center. The call center then facilitates connection to an emergency response team. The emergency response team can include police and medical assistance.

However, the emergency response team should react rapidly and choose the convenient contact persons among several possibilities. Then, there is a risk that the emergency response team only receives partial information with regard to the situation.

This implies that the response may not be appropriate to the situation. For example, if the driver is unwell or if the accident involves a large number of vehicles, the assistance required will not be the same.

There is therefore a need to improve assistance when an accident occurs.

SUMMARY

An object of the invention is to provide a personalized notification system to be installed in a vehicle and that is configured to gather information about the circumstances of the accident and to transfer said information to a distant emergency center.

The object is achieved by a personalized notification system for a vehicle comprising:
a positioning system to be installed in said vehicle for determining the location of the vehicle;
a communication unit to be installed in said vehicle and configured to exchange data with a remote center;
a data gathering unit to be installed in said vehicle and configured to gather information about a driver of the vehicle, the data gathering unit comprising biometric sensor(s) and/or behavioral sensor(s) for monitoring the driver, the data gathering unit being also configured for determining contact(s) to be warned in case of an emergency in relation with the location of the vehicle, said contacts being obtained from a memory of the vehicle and/or from the remote center;
a database containing logged data from the positioning system and the data gathering unit, said logged data being registered at defined intervals,
an emergency detection unit configured to receive an alert from the vehicle regarding a vehicle emergency situation and notify the contact(s) to be warned in case of an emergency as defined in the last registered logged data.

The data gathering unit has a dual purpose. It gathers information about the state of the driver on a regular basis. Data from biometric sensor(s) and/or behavioral sensor(s) are therefore logged in the database on a regular basis. It constitutes a basis that can help to determine a health and/or behavior problem of the driver.

In addition, the data gathering unit determines contact(s) to be warned in case of an emergency. There is an adaptation of the contact(s) to be warned in relation with the location of the vehicle.

As an example, contact(s) can comprise family members, personnel of the driver firm, police, firefighters and/or hospitals within a defined range around the location of the vehicle.

Thus, personalized notification are prepared and registered in the database to be ready for expedition when the emergency detection unit receives an alert from the vehicle. This personalized notification system then enables to target and notify rapidly the contact(s) that can potentially help the driver in the most efficient way.

This shall help the emergency response team to understand the person's health situation during the incident and shall have a holistic view. This also helps the accident research team to identify potential causes of accident.

According to an aspect of the invention, each occurrence of the logged data that are registered as defined intervals comprise biometric data and/or behavioral data from the data gathering unit associated with the location of the vehicle and the contact(s) determined according to the location of the vehicle, the emergency detection unit being configured for sending notifications to the contacts comprising the data from the last occurrence of the logged data.

Therefore, the contact(s) receive the latest data available known from the situation of the drive, namely location, heath and/or behavior information of the driver.

According to an aspect of the invention, the data gathering unit includes a driver identification module configured for identifying the driver on the basis of identity recognition thanks to the biometric sensor(s) and/or behavioral sensor(s) and/or on the basis of a signal from the vehicle that recognizes a determined phone, badge and/or card connection to a corresponding device of the vehicle.

The driver recognition can use different means. The driver can have a phone that can be detected by a device of the vehicle. As an example, the driver can be recognized by logging on a dedicated application that communicated with the vehicle.

Alternatively or in addition, the vehicle can be equipped with a device for detecting a badge or swiping a personal card.

In particular, the identification module can be able to recognize driver card (e.g. tachograph cards), or can realize biometrics identification (e.g., finger print scan, retina scan, etc.) or social security numbers, national identity numbers can be seized by the driver. Any other personal identification mechanism (card, chip, etc.) that connects to person's unique identity can also be used.

According to an aspect of the invention, the data gathering unit is configured to include personal health information of the driver in the logged data based on the identity of the driver, said personal health information originating from the memory of the vehicle and/or from the remote center.

In addition to instant data that are recorded on a regular basis in the database, important information concerning the health of the driver can also be included in the logged data and therefore in the notification sent to the contact(s).

The personal health information can include blood type and/or pathologies from which suffers the driver. The goal of the personalized notification system is to gain time by identifying the most appropriate care that needs the driver in case of an accident.

Health information retrieval is thus updating the database. The personal health information can include a unique identification number, insurance details, hospitals (both connected to insurance companies and general hospitals nearby to location), medical history, doctor/medical-help contacts (including the ones associated to personnel's history like family doctor, associated with insurance agencies and general ones nearby to location), etc.

According to an aspect of the invention, the data gathering unit is configured to identify a health and/or behavioral emergency situation from the data of the biometric sensor(s) and/or behavioral sensor(s) to alert the emergency detection unit so as to notify the contact(s).

Even, if the vehicle has no functioning problem and do not detect an accident, the sensors are used to monitor the driver health and/or behavior. If a health problem is detected, the contacts are warned.

According to an aspect of the invention, the biometric sensor(s) are configured to be installed at seats and/or belts and/or steering wheel of the vehicle, and/or the behavioral sensor(s) includes movement detector and/or camera.

Biometric sensor(s) concerns data from the body of the driver that can be measured as the heart rate, temperature, etc. Behavioral sensor(s) aims at deducting a health situation of the driver based on unusual movements and/or postures (i.e. closed eyes, motionless for a determined period, screams, etc.).

In addition, drowsiness information log is taken from vehicle through means like driving pattern algorithms, camera image processing techniques in combination with bio signals (e.g., inputs from $CO_2$ sensor chips) where applicable.

According to an aspect of the invention, the emergency detection unit is configured to send notifications to the contact(s) by using the communication unit, the communication unit being configured to receive receipt confirmation from the contact(s) and realizing new sending attempt(s) otherwise.

The personalized notification system assures that the contact(s) have properly received the notification.

According to an aspect of the invention, the emergency detection unit is configured to check if the biometric sensor(s) and/or behavioral sensor(s) are detecting the driver, and to check if the positioning system and contact(s) to be warned retrieval also work, the emergency detection unit sending a functioning restriction order to the vehicle otherwise.

This prevents that personalized notification system becomes ineffective. Preferably, a functioning restriction order can correspond to a vehicle speed restriction (e.g. not above 5 km/hr.). The emergency detection unit is also configured to check the good functioning of the driver identification module when used.

According to an aspect of the invention, the data gathering unit and the database are configured to work for several occupants of the vehicle including the driver.

This mechanism can scale to have multiple person's entries in case more person than one travelling in a vehicle.

The present invention also concerns a vehicle including said personalized notification system.

The present invention concerns as well a personalized notification method comprising following steps:
having a personalized notification system as described above,
determining the location of the vehicle;
gathering information about a driver of the vehicle, said information comprising data from the biometric sensor(s) and/or behavioral sensor(s) and configured to obtain contact(s) to be warned in case of an emergency in relation with the location of the vehicle,
registering logged data from the positioning system and the data gathering unit at defined intervals,
notifying the contact(s) to be warned further to an alert reception from the vehicle regarding a vehicle emergency situation, a notification comprising the logged data latest occurrence that are registered in the database.

When notifying the contact(s), it concerns the contact(s) determined according to the latest known location of the vehicle.

According to an aspect of the invention, the contact(s) to be warned in case of an emergency in relation with the location of the vehicle are updated by the driver via a command device configured to be synchronized with the vehicle memory and/or the remote center.

As an example, when driver phone is connected, there is an option to add/remove emergency contact(s). Rules can also be defined in relation with the location of the vehicle. As default setting, nearby contact(s) are selected within a defined area around the vehicle. This is interesting for hospital and emergency services. However, for family, the contact(s) are not obligatory nearby.

Synchronization can also be used to update information related to vehicle such as vehicle insurance.

According to an aspect of the invention, logged data registered at defined intervals include pre-recorded crash messages with location information and biometric data and/or behavioral data of the driver, the notification sent in case of an alert including a pre-recorded crash message concerning the last occurrence of registered logged data.

According to an aspect of the invention, the personalized notification method further includes a step consisting in receiving a receipt confirmation of the notification from the contact(s), the step also consisting in realizing new notification sending attempt(s) otherwise.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
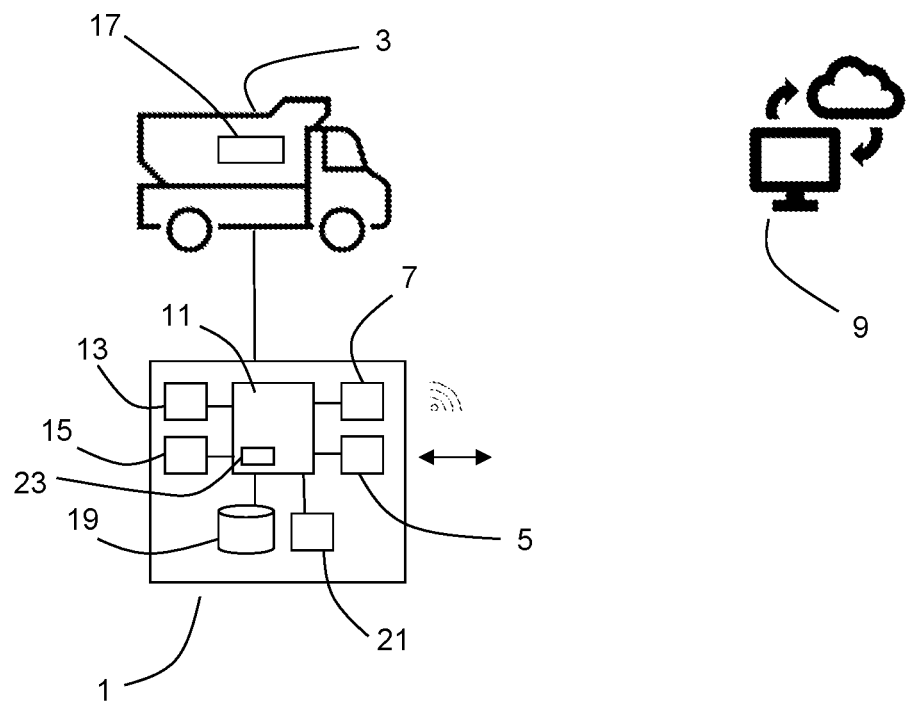
FIG. 1 is a schematic view of a personalized notification system for a vehicle.

As illustrated in FIG. 1, a personalized notification system 1 for a vehicle 3 comprises a positioning system 5 to be installed in said vehicle 3 for determining the location of the vehicle 3.

The personalized notification system 1 comprises a communication unit 7 to be installed in said vehicle 3 and configured to exchange data with a remote center 9.

The personalized notification system 1 comprises a data gathering unit 11 to be installed in said vehicle 3 and configured to gather information about a driver of the vehicle 3. The data gathering unit 11 comprises biometric sensor(s) 13 and/or behavioral sensor(s) 15 for monitoring the driver.

The data gathering unit 11 is also configured for determining contact(s) to be warned in case of an emergency in relation with the location of the vehicle, said contacts being obtained from a memory 17 of the vehicle 3 and/or from the remote center 9.

The data gathering unit 11 is connected to the position system 5 and the communication unit 7 so as to obtain the position of the vehicle 3 and to wirelessly exchange data from the remote center 9. Wireless network as phone network or Wi-Fi can be used.

The personalized notification system 1 comprises a database 19 containing logged data from the positioning system 5 and the data gathering unit 11, said logged data being registered at defined intervals.

The personalized notification system 1 comprises an emergency detection unit 21 configured to receive an alert from the vehicle 3 regarding a vehicle emergency situation and notify the contact(s) to be warned in case of an emergency as defined in the last registered logged data.

As an example, contact(s) can comprise family members, personnel of the driver firm, police, firefighters and/or hospitals within a defined range around the location of the vehicle 3. Contact(s) can be phone numbers, emails, or logins.

The data gathering unit 11 can be a processor linked to the other elements of the personalized notification system 1.

Each occurrence of the logged data that are registered as defined intervals comprise biometric data and/or behavioral data from the data gathering unit 11 associated with the location of the vehicle 3 and the contact(s) determined according to the location of the vehicle 3, the emergency detection unit 21 being configured for sending notifications to the contacts comprising the data from the last occurrence of the logged data via the communication unit 7.

Therefore, the contact(s) receive the latest data available known from the situation of the drive, namely location, heath and/or behavior information of the driver.

The data gathering unit 11 includes a driver identification module 23 configured for identifying the driver on the basis of identity recognition thanks to the biometric sensor(s) 13 and/or behavioral sensor(s) 15, on the basis of a signal from the vehicle 3 that recognizes a determined phone, badge or card connection to a corresponding device of the vehicle 3.

The driver recognition can use different means. The driver can have a phone that can be detected by a device of the vehicle 3. As an example, the driver can be recognized by logging on a dedicated application that communicated with the vehicle 3.

Alternatively or in addition, the vehicle 3 can be equipped with a device for detecting a badge or swiping a personal card.

In particular, the driver identification module 23 can be able to recognize driver card (e.g. tachograph cards), or can realize biometrics identification (e.g., finger print scan, retina scan, etc.) or social security numbers, national identity numbers can be seized by the driver. Any other personal identification mechanism (card, chip, etc.) that connects to person's unique identity can also be used.

The data gathering unit 11 is configured to include personal health information of the driver in the logged data based on the identity of the driver, said personal health information originating from the memory 17 of the vehicle 3 and/or from the remote center 9.

In addition to instant data that are recorded on a regular basis in the database 19, important information concerning the health of the driver can also be included in the logged data and therefore in the notification sent to the contact(s).

The personal health information can include blood type and/or pathologies from which suffers the driver. The goal of the personalized notification system is to gain time by identifying the most appropriate care that needs the driver in case of an accident.

Health information retrieval is thus updating the database. The personal health information can include a unique identification number, insurance details, hospitals (both connected to insurance companies and general hospitals nearby to location), medical history, doctor/medical-help contacts (including the ones associated to personnel's history like family doctor, associated with insurance agencies and general ones nearby to location), etc.

The data gathering unit 11 is configured to identify a health and/or behavioral emergency situation from the data of the biometric sensor(s) 13 and/or behavioral sensor(s) 15 to alert the emergency detection unit 21 so as to notify the contact(s).

Even, if the vehicle 3 has no functioning problem and do not detect an accident, the sensors are used to monitor the driver health and/or behavior. If a health problem is detected, the contacts are warned.

The biometric sensor(s) 13 are installed at seats and/or belts and/or steering wheel of the vehicle, and the behavioral sensor(s) 15 includes movement detector and/or camera.

Biometric sensor(s) 13 concerns data from the body of the driver that can be measured as the heart rate, temperature, etc. Behavioral sensor(s) 15 aims at deducting a health situation of the driver based on unusual movements and/or postures (i.e. closed eyes, motionless for a determined period, screams, etc.).

In addition, drowsiness information log is taken from vehicle 3 through means like driving pattern algorithms, camera image processing techniques in combination with bio signals (e.g., inputs from $CO_2$ sensor chips) where applicable.

The emergency detection unit 21 is configured to send notifications to the contact(s) by using the communication unit, the communication unit being configured to receive receipt confirmation from the contact(s) and realizing new sending attempt(s) otherwise.

The personalized notification system 1 assures that the contact(s) have properly received the notification.

The emergency detection unit 21 is configured to check if the biometric sensor(s) 13 and/or behavioral sensor(s) 15 are detecting the driver, and to check if the positioning system 5 and contact(s) to be warned retrieval also work, the emergency detection unit 21 sending a functioning restriction order to the vehicle 3 otherwise.

This prevents that personalized notification system becomes ineffective. Preferably, a functioning restriction order can correspond to a vehicle speed restriction (e.g. not above 5 km/hr.). The emergency detection unit 21 is also configured to check the good functioning of the driver identification module 23 when used.

The data gathering unit 11 and the database 19 are configured to work for several occupants of the vehicle 3 including the driver.

This mechanism can scale to have multiple person's entries in case more person than one travelling in a vehicle.

The present invention also concerns a vehicle 3 including said personalized notification system 1.

Figure 2:
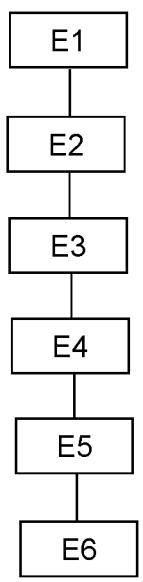
FIG. 2 is a personalized notification method using said system.

As illustrated in FIG. 2, a personalized notification method comprises following steps:

E1 having a personalized notification system as described above,

E2 determining the location of the vehicle;

E3 gathering information about a driver of the vehicle 3, said information comprising data from the biometric sensor(s)

13 and/or behavioral sensor(s) 15 and configured to obtain contact(s) to be warned in case of an emergency in relation with the location of the vehicle 3, E4 registering logged data from the positioning system 5 and the data gathering unit 11 at defined intervals, E5 notifying the contact(s) to be warned further to an alert reception from the vehicle 3 regarding a vehicle emergency situation, a notification comprising the logged data latest occurrence that are registered in the database, and E6 receiving a receipt confirmation of the notification from the contact(s), the step also consisting in realizing new notification sending attempt(s) otherwise.

When notifying the contact(s), it concerns the contact(s) determined according to the latest known location of the vehicle.

The contact(s) to be warned in case of an emergency in relation with the location of the vehicle 3 are updated by the driver via a command device configured to be synchronized with the vehicle memory 17 and/or the remote center 9.

As an example, when driver phone is connected, there is an option to add/remove emergency contact(s). Rules can also be defined in relation with the location of the vehicle 3. As default setting, nearby contact(s) are selected within a defined area around the vehicle 3. This is interesting for hospital and emergency services. However, for family, the contact(s) are not obligatory nearby.

Synchronization can also be used to update information related to vehicle 3 such as vehicle insurance.

Logged data registered at defined intervals include pre-recorded crash messages with location information and biometric data and/or behavioral data of the driver, the notification sent in case of an alert including a pre-recorded crash message concerning the last occurrence of registered logged data.

The method enables to gather information about the state of the driver on a regular basis. Thus, personalized notification are prepared and registered in the database to be ready for expedition when the emergency detection unit receives an alert from the vehicle 3. This personalized notification system 1 then enables to target and notify rapidly the contact(s) that can potentially help the driver in the most efficient way.

This shall help the emergency response team to understand the person's health situation during the incident and shall have a holistic view. This also helps the accident research team to identify potential causes of accident.

It is to be understood that the present invention is not limited to the embodiments described above and illustrated in the drawings; rather, the skilled person will recognize that many changes and modifications may be made within the scope of the appended claims.

The invention claimed is:

1. A personalized notification system for a vehicle comprising:
   a positioning system to be installed in said vehicle for determining the location of the vehicle;
   a communication unit to be installed in said vehicle, wherein the communication unit exchanges data with a remote center;
   a data gathering unit to be installed in said vehicle and configured to gather health information about a driver of the vehicle and a driver circumstance of a vehicle emergency situation, the data gathering unit comprising biometric sensor(s) and/or behavioral sensor(s) for monitoring the driver, the data gathering unit being also configured for determining contact(s) to be warned in case of an emergency in relation with the location of the vehicle, said contacts being obtained from a memory of the vehicle and/or from the remote center;
   a database containing logged data from the positioning system and the data gathering unit, said logged data being registered at defined intervals, and
   an emergency detection processor configured to receive an alert from the vehicle regarding the vehicle emergency situation and notify the contact(s) to be warned in case of an emergency as defined in the last registered logged data, wherein the gathered health information and the driver circumstance of the vehicle emergency situation are sent to the contact(s),
   wherein the emergency detection processor is configured to check if the biometric sensor(s) and/or behavioral sensor(s) are detecting the driver, and to check if the positioning system and contact(s) to be warned retrieval also work, the emergency detection processor sending a functioning restriction order to the vehicle otherwise.

2. The personalized notification system according to claim 1, wherein each occurrence of the logged data that are registered as defined intervals comprise biometric data and/or behavioral data from the data gathering unit associated with the location of the vehicle and the contact(s) determined according to the location of the vehicle, the emergency detection processor being configured for sending notifications to the contacts comprising the data from the last occurrence of the logged data.

3. The personalized notification system according to claim 1, wherein the data gathering unit includes a driver identification module configured for identifying the driver on the basis of identity recognition thanks to the biometric sensor(s) and/or behavioral sensor(s) and/or on the basis of a signal from the vehicle that recognizes a determined phone, badge and/or card connection to a corresponding device of the vehicle.

4. The personalized notification system according to claim 1, wherein the data gathering unit is configured to include personal health information of the driver in the logged data based on the identity of the driver, said personal health information originating from the memory of the vehicle and/or from the remote center.

5. The personalized notification system according to claim 1, wherein the data gathering unit is configured to identify a health and/or behavioral emergency situation from the data of the biometric sensor(s) and/or behavioral sensor(s) to alert the emergency detection processor so as to notify the contact(s).

6. The personalized notification system according to claim 1, wherein the biometric sensor(s) are configured to be installed at seats and/or belts and/or steering wheel of the vehicle, and/or wherein the behavioral sensor(s) includes movement detector and/or camera.

7. The personalized notification system according to claim 1, wherein the emergency detection processor is configured to send notifications to the contact(s) by using the communication unit, the communication unit being configured to receive receipt confirmation from the contact(s) and realizing new sending attempt(s) otherwise.

8. The personalized notification system according to claim 1, wherein the data gathering unit and the database are configured to work for several occupants of the vehicle including the driver.

9. A personalized notification method comprising following steps:
- (E1) having a personalized notification system according to claims 1,
- (E2) determining the location of the vehicle;
- (E3) gathering health information about a driver of the vehicle and a driver circumstance of a vehicle emergency situation, said information comprising data from the biometric sensor(s) and/or behavioral sensor(s) and configured to obtain contact(s) to be warned in case of an emergency in relation with the location of the vehicle,
- (E4) registering logged data from the positioning system and the data gathering unit at defined intervals, and
- (E5) notifying the contact(s) to be warned further to an alert reception from the vehicle regarding a vehicle emergency situation, a notification comprising the logged data latest occurrence that are registered in the database, the gathered health information and the driver circumstance of the vehicle emergency situation.

10. The personalized notification method according to claim 9, wherein the contact(s) to be warned in case of an emergency in relation with the location of the vehicle are updated by the driver via a command device configured to be synchronized with the vehicle memory and/or the remote center.

11. The personalized notification method according to claim 9, wherein logged data registered at defined intervals include pre-recorded crash messages with location information and biometric data and/or behavioral data of the driver, the notification sent in case of an alert including a pre-recorded crash message concerning the last occurrence of registered logged data.

12. The personalized notification method according to claim 9, further including a step (E6) consisting in receiving a receipt confirmation of the notification from the contact(s), the step also consisting in realizing new notification sending attempt(s) otherwise.

* * * * *